Dec. 11, 1956 O. G. VILLARD, JR 2,774,043

FREQUENCY SELECTIVE APPARATUS

Filed March 3, 1953 2 Sheets-Sheet 1

INVENTOR.
Oswald G. Villard, Jr.
BY
Flehr & Swain
ATTORNEYS

FREQUENCY SELECTIVE APPARATUS

Filed March 3, 1953 2 Sheets-Sheet 2

INVENTOR.
Oswald G. Villard, Jr.

BY

Flehr & Swain

ATTORNEYS 2,774,043
Patented Dec. 11, 1956

2,774,043

FREQUENCY SELECTIVE APPARATUS

Oswald G. Villard, Jr., Palo Alto, Calif.

Application March 3, 1953, Serial No. 339,985
3 Claims. (Cl. 333—80)

This invention relates generally to electrical apparatus which perform the functions of a filter to discriminate with respect to specified frequency or frequency band.

It is an object of the present invention to provide apparatus of the above character which is particularly applicable to existing communications receivers or like apparatus employing amplification at intermediate frequencies. Attachment of my device is accomplished by means of one wire connected to the plate or grid of one tube and the use of the common ground in the existing amplifier. No circuit changes or retuning of the existing amplifier are required.

It is a further object of the present invention to provide apparatus which is relatively flexible in its application and which can be made to have characteristics which are comparable to or better than filters of the crystal type.

Another object of the invention is to provide apparatus of the above character which can be utilized for exalted-carrier double or single sideband reception.

Another object of the invention is to provide apparatus of the above character having means serving to facilitate adjustment over a substantial frequency range with maintenance of a desired relationship between the characteristic response curve and a reference base line.

Another object of the invention is to provide an apparatus and method which makes possible a narrow response peak superposed on the normal response of an intermediate frequency amplifier.

Additional objects and features of the invention will appear from the following description in which the preferred embodiments of the invention have been set forth in detail in conjunction with the accompanying drawing.

Referring to the drawing.

Figures 5A, B, C, and D, are oscilloscope patterns illustrating application of my invention to an intermediate frequency amplifier network.

Figure 6:
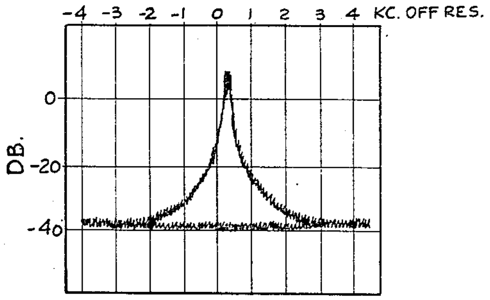

Figure 6 is an oscilloscope pattern illustrating a peak response which can be obtained by use of the invention.

Figure 7:
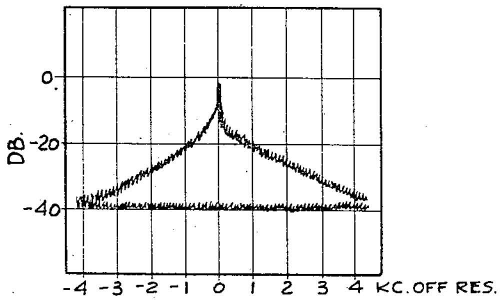

Figure 7 is an oscilloscope pattern illustrating the manner in which my invention can be applied to exalted-carrier reception.

In accordance with the present invention, I provide a circuit, external to an existing amplifier whose frequency selective characteristics are to be modified, having a conducting path to ground which includes the plate to cathode impedance of a vacuum tube. A loop is connected from plate to ground of the tube to feed back energy to the same. This loop includes a tuned circuit having Q multiplication. Assuming that the conducting path is connected between a plate conductor of an intermediate frequency amplifier or like apparatus, and ground, the effective impedance of the tube and its feed back loop at the resonant frequency is such as to provide a null or peak in the amplifier response.

Figure 1:
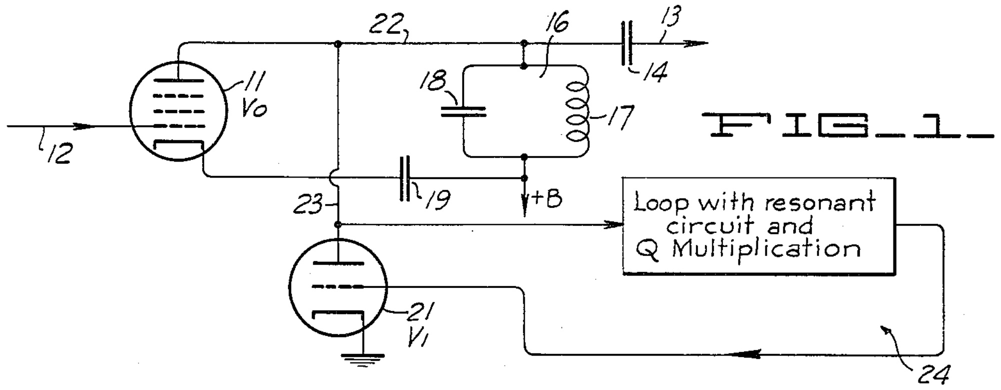
Figure 1 is a circuit diagram schematically illustrating apparatus incorporating the present invention.

Referring first to Figure 1, I have shown a part of an intermediate amplifier section such as is used in modern communications receivers, and comprising the vacuum tube 11 ($V_0$) which can be of the pentode type. The voltage input lead 12 is connected to the control grid of tube 11, and the output lead 13 is coupled to the plate of the tube 11 by condenser 14. The plate circuit of the tube 11 includes the parallel resonant circuit 16, consisting of the inductance 17 shunted by the condenser 18. One terminal of the parallel resonant circuit is connected to the plate of tube 11, the other terminal has a connection to the cathode through the by-pass condenser 19. A source of plate voltage is shown being connected to the plate through the inductance. It will be evident that the cathode can be connected to suitable biasing means such as a grounded biasing resistor. In a typical instance the parallel resonant circuit 16 can be tuned to a frequency such as 455 kc., and the frequency characteristics of the entire amplifier section can be such that it passes a band of frequencies ranging from 450 to 460 kc.

In accordance with my invention, I provide a vacuum tube 21 ($V_1$) which is connected whereby its plate to cathode path forms a part of a path which connects between the plate lead 22 and a point of neutral potential, such as ground. Thus conductor 23 is shown connected between the plate of tube 21 and the conductor lead 22, and the cathode is grounded. The plate and the control grid of tube 21 are connected to a loop 24 which includes a resonant circuit adapted to be tuned to the frequency to be passed or rejected, and which is provided with electronic Q multiplication. The multiplied Q may, for example, range from 2000 to 8000, assuming that the multiplication may range from 20 to 40 times, and that the resonant circuits employed have Q's between 100 and 200.

Assuming that it is desired to produce a null at the frequency to which the loop 24 is tuned, the loop can include a tuned regenerative amplifier. The amount of positive feedback employed in the amplifier determines the Q multiplication. The connection polarity in the amplifier is such that the through phase shift at resonance is zero. With a tuned regenerative amplifier connected to the tube 21 in this manner, the tube is provided with strong negative voltage feedback at resonance.

Figure 2:
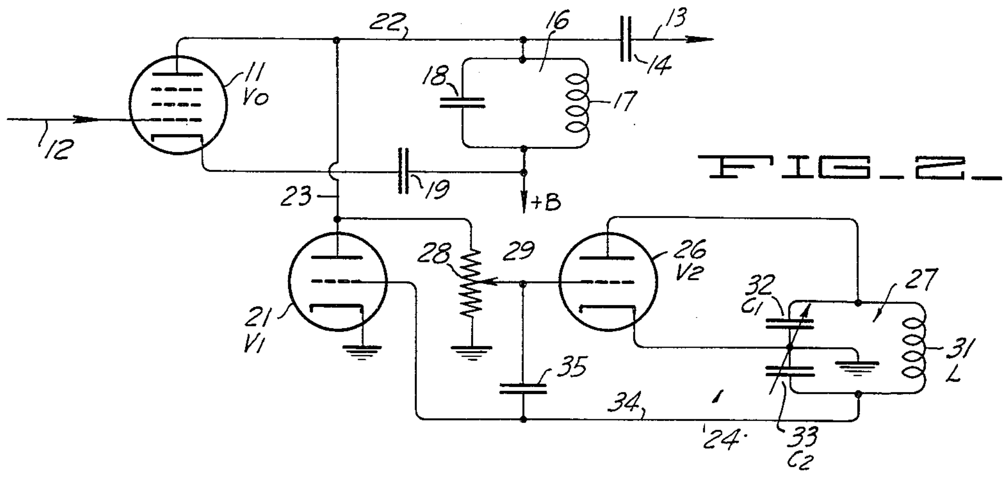
Figure 2 is a circuit diagram illustrating my invention applied to reject a selected frequency, or in other words, to secure a null response at a desired frequency.

Figure 2 illustrates a regenerative amplifier connected in the loop 24. This amplifier consists of a suitable triode 26 ($V_2$) having a parallel resonant circuit 27 connected in its plate circuit. The plate of the tube 21 is connected to one terminal of the resistor 28, the other end of which is grounded. Also the plate is connected to a suitable source of plate voltage.

The adjustable tap 29 on this resistor is connected to the control grid of tube 26. The resonant circuit 27 includes the inductance 31, which is shunted by the series connected variable condensers 32 and 33. The point of connection between these condensers is connected to the cathode and to ground. One terminal of the inductance is directly connected to the plate, and the other terminal is connected by conductor 34 to the control grid of tube 21, and also through condenser 35 to the grid of tube 26 thereby completing the feedback loop. With this arrangement positive feedback is provided for the tube 26 at the resonant frequency, and the connections are such that at the same frequency negative feedback is provided for the tube 21.

A mathematical analysis of the arrangement shown in

Figure 2 is as follows: A perfect null is obtained when the effective plate resistance of tube 21 is substantially zero. It may be shown that Z, the effective plate resistance of tube 21 ($V_1$) can be expressed by the following equation:

*Equation 1*

$$Z=\frac{r_{p1}(1-A_2\beta_2)}{1-A_2\beta_2+kA_1A_2}$$

where:

$r_{p1}$ is the actual plate resistance of tube $V_1$.
$A_1$ and $A_2$ are the no-feedback gains of tubes 21 and 26 ($V_1$ and $V_2$) respectively.
$\beta_2$ is the feedback fraction of the tube 26 ($V_2$).
$k$ is an attenuation constant controlling the magnitude of $\beta_1$ (the effective feedback fraction of tube $V_1$).

The effective plate resistance Z becomes zero when $A_2\beta_2=1$. This is the condition for oscillation of the amplifier tube 26, if tube 21 were not connected. However, the path through tube 21 represents negative feedback insofar as tube 26 is concerned, and oscillation will not occur even though $A_2\beta_2$ is equal to unity and the null is perfect.

The amplifier tube 26 has in effect two voltage feedback loops; one positive ($\beta_2$) and one negative ($kA_1$). The net positive feedback, which multiplies the intrinsic Q of the tuned circuit, is the difference of these two. The effective Q of the tuned circuit can be expressed by an equation as follows:

*Equation 2*

$$Q_{eff}=Q\frac{1}{1-A_2\beta_2+kA_1A_2}$$

Since $(1-A_2\beta_2)$ must be set to zero to give a perfect null, the effective coil Q is controllable by varying the attenuation constant $k$.

To the extent that $A_1\beta_1$ is large compared to unity at resonance, the variation of Z with frequency is essentially the inverse of the variation of the quantity $B_1$ with frequency.

It is desirable to maintain the depth of the null over a substantial tuning range. In other words, it is desirable to maintain the magnitude of $\beta_2$ at resonance substantially independent of tuning. Since tube 26 ($V_2$) is essentially a constant current generator, and the parallel resonant impedance in its plate circuit (without feedback) is proportional to $\omega LQ$, $A_2$ will vary directly with frequency if the total capacitance is varied for tuning over a small frequency range. Even though the required percentage of tuning variation is small and the change in $A_2\beta_2$ is small, the change in $(1-A_2\beta)_2$ would nevertheless be noticeable. This change can be greatly reduced by proper choice of the ratio of $C_1$ to $C_2$ and by tuning with one capacitor alone.

$A_2\beta_2$ can be expressed by an equation as follows:

*Equation 3*

$$A_2\beta_2=g_mLQ\frac{(C_2C_1)^{1/2}}{(C_2+C_1)^{3/2}}$$

where:

$g_m$ is the mutual conductance of $V_2$,
$C_1$ and $C_2$ are the capacitance values of the condensers 32 and 33,
L is the inductance 31,
Q refers to the Q of the inductance L under the assumption that $C_1$ and $C_2$ are loss free.

Since Q may be regarded as constant over the narrow frequency range under consideration, the objective (as to maintenance of the null depth) can be obtained by minimizing the change in the right hand side of the Equation 3, when $C_1$ is varied. A minimum change occurs when $C_2=2C_1$. For small variations about this value of $C_1$, $(1-A_2\beta_2)$ will be substantially constant.

Figure 3:
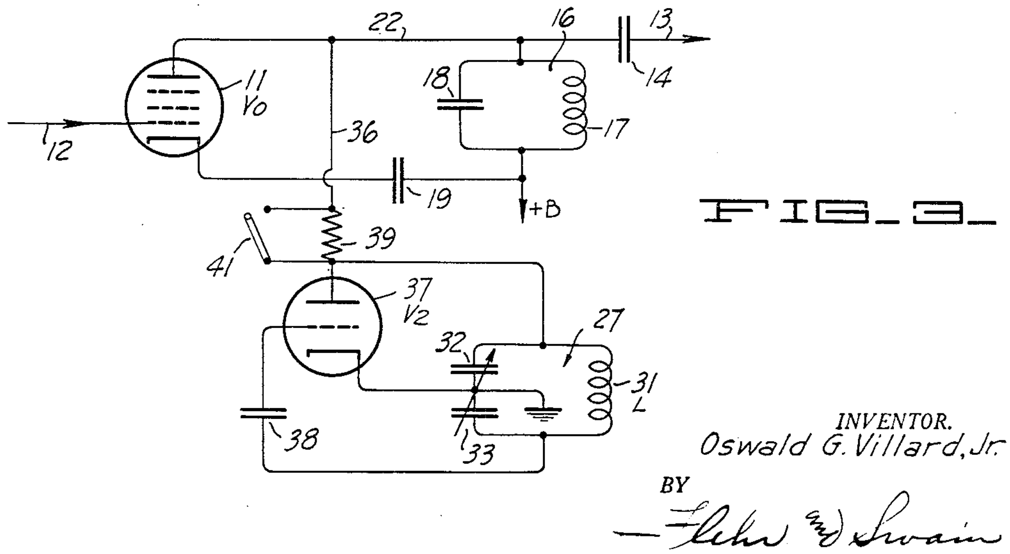
Figure 3 is a circuit diagram illustrating the invention applied to secure a peak response at a selected frequency.

As previously stated, by applying positive feedback to the tube 21 of Figure 1, it is possible to secure a peak rather than a null, at the selected frequency. An arrangement for this purpose is shown in Figure 3. In this instance conductor 36 connects between the conductor 22 of the intermediate frequency amplifier, and the plate of the tube 37. The cathode of this tube is grounded. The parallel resonant circuit 27 has its one side connected to the plate of tube 37, and its other side coupled to the control grid of tube 37 through condenser 38. A resistor 39 is inserted in series with conductor 36, and is adapted to be shunted out by the switch 41.

Assuming first that the switch 41 is closed, the impedance level of the tuned circuit 27 is made relatively low compared to that of the plate circuit of the amplifier tube 11. The response obtained by tube 37 together with tuned circuit 27, is then capable of controlling the overall frequency response of tube 11. When the tuned circuit 27 is off tune, its insertion loss insofar as tube 11 is concerned is relatively high. However, at or near resonance the Q of this circuit is multiplied by tube 37, its parallel resonant impedance becomes large and the gain of amplifier tube 11 may equal or even exceed the normal gain. Excess positive feedback in tube 37 is to be avoided, because it causes the entire circuit to oscillate.

It will be evident from the above that the arrangement of Figure 3 provides a sharp response peak at the frequency to which the circuit 27 is tuned. By way of example, the apparatus can be constructed to enable selective tuning over a frequency range of from 450 to 460 kc. or more if desired.

Opening of switch 41 causes the resistor 39 to be inserted in series with conductor 36, and this has the effect of de-coupling the resonant circuit 27 from the intermediate frequency amplifier section comprising tube 11 and resonant circuit 16. Thus, the insertion loss caused by the circuit 27 is greatly reduced but a peak in the response of tube 11 still appears at the resonant frequency of tuned circuit 27. This peak may be narrowed in width and increased in height by increasing the positive feedback of tube 37. Thus a resonant peak can be superposed on the transmission characteristic curve of the intermediate frequency amplifier. Assuming that the height of the peak above the rest of the transmission curve is to be a convenient value (e. g. 10 db), its band width may be controlled by adjusting the positive feedback around tube 37 and the value of resistance (39) required to give this particular height. The larger the value of resistance is made, the greater the positive feedback required, and the narrower the resulting band width.

The characteristics obtained by insertion of the resistor 39 are useful for exalted-carrier reception of AM signals, or for reception of reduced carrier single side band transmissions. The peak can be made sufficiently narrow whereby only the carrier receives extra amplification with the side bands being transmitted at normal gain level.

The arrangement and characteristics last described are useful with relatively stable receivers having band spread tuning and signal strength meters, because the tuning may be done by maximizing the meter indication in the usual way. When the superposed sharp peak is set to either side of the normal receiver pass band center, symmetry of the sharp peak with respect to the normal transmission characteristics of the amplifier is affected by the tuning of the resonant circuit in the receiver to which the unit is connected.

Figure 4:
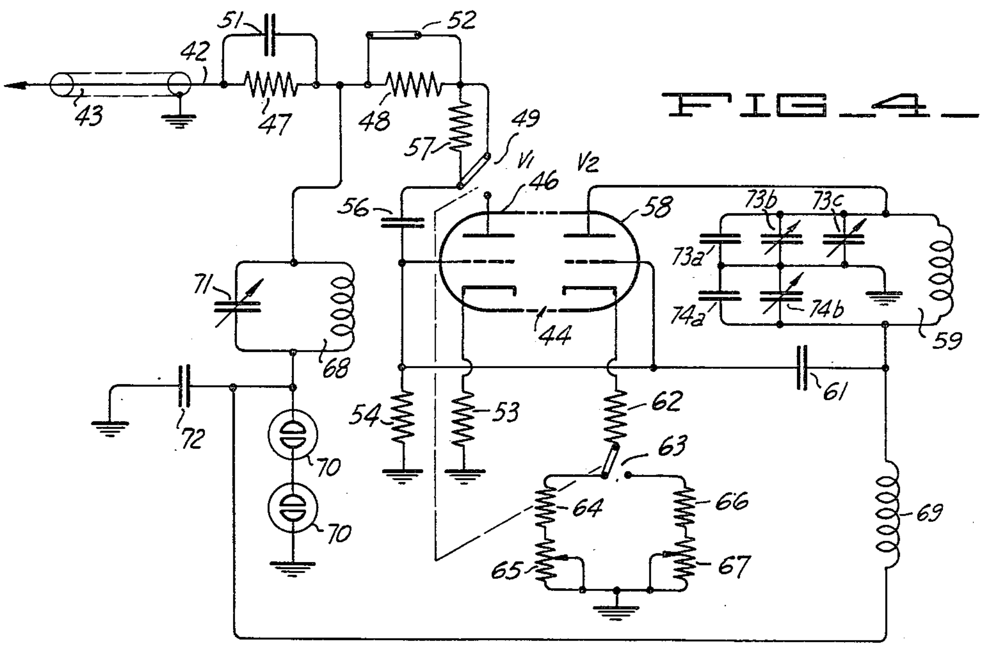
Figure 4 is a circuit diagram illustrating the invention applied to secure either a null or peak response at a selected frequency.

The features of Figures 2 and 3 are combined in the circuit of Figure 4. In this instance the conductor 42 is provided with a grounded shield 43 and represents the conductor which is connected to the intermediate frequency amplifier or like apparatus. A convenient point of connection would be the plate of the amplifier tube. A dual triode tube 44 is employed, with the tube half 46 having its plate coupled to conductor 42, through the series connected resistors 47 and 48, and the switch 49. Resistor 47 is provided with a by-pass condenser 51, and resistor 48 is shunted by switch 52. The cathode of the tube half 46 is grounded through the biasing resistor 53. The control grid of the tube half 46 is connected to ground through the grid resistor 54, and is coupled through condenser 56 and resistor 57 to switch 52 and resistor 48. Resistor 57 can be shorted out by switch 49. The other half 58 of the tube 44 has its plate connected to one terminal of the parallel resonant circuit 59, and the other terminal of this circuit is coupled to the control grids by condenser 61. The cathode of the tube half 58 is connected to ground through resistor 62 and the switch 63. One contact of this switch connects to ground through resistors 64 and 65, and the other contact connects to ground through resistors 66 and 67. Resistors 65 and 67 are adjustable and in the form of potentiometers. A plate current for tube 46 can be obtained from the intermediate frequency amplifier with which the apparatus is used. Current for the tube half 58 is obtained by a circuit including the inductance 68 and the radio frequency choke 69. Voltage regulation is provided by the neon tubes 70. Inductance 68 is shown shunted by condenser 71, and the connection to tubes 70 is connected to the grounded by-pass condenser 72.

Fixed condenser **73*a* of the tuned circuit 59 is shunted by the variable condensers 73*b* and 73*c*. Likewise the fixed condenser 74*a* is shunted by the variable condenser 74*b*. Condenser 73*c*** can be used for tuning.

As indicated, it is desirable to operate the two switches 49 and 63 from a common control means. The position of these switches illustrated in Figure 4 provides a peak response, and the other setting of these switches provides a null. Switch 52 can be opened when switches 49 and 63 are in the peak position to provide exalted-carrier operation as previously described. The inductance 68 is tuned to neutralize the capacity of the shielded or coaxial cable 43. The two variable potentiometers 65 and 67 are adjusted to control the feedback for peak or null operation for the tube half 58. Condensers **73*b* and 74*b*** can be described as adjustable padding condensers whose ratio can be set to minimize variations in feedback with tuning.

When the switches 49 and 63 are in the positions illustrated to secure a peak response, positive feedback is provided for the tube half 58 as only this half of the tube is in the circuit. When the positions of switches 49 and 63 are changed, positive feedback is still provided to tube half 58, but only for the purpose of providing negative feedback for tube half 46.

In one particular instance, the values of the component parts of the circuit shown in Figure 4 were as follows:

The values of the various resistors were: 47—33,000 ohms; 48—33,000 ohms; 57—470,000 ohms; 54—2 megohms; 53—1500 ohms; 62—1500 ohms; 64—6800 ohms; 65—1000 ohms; 66—7500 ohms; 67—1000 ohms. The various condensers had values as follows: 51—0.005$\mu$ farads; 71—100$\mu\mu$f.; 56—500$\mu\mu$f.; **73*a*—500$\mu\mu$f.; 73*b*—40–300$\mu\mu$f.; 73*c*—100$\mu\mu$f.; 74*a*—1500$\mu\mu$f.; 74*b*—40–300$\mu\mu$f.; 61—500$\mu\mu$f. The inductance for circuit 68 had a value of 1.4 mh., and the inductance for the tuned circuit 59**, 250$\mu$ h. The tube was one known by manufacturers' specifications as No. 12AX7.

Figure 5:
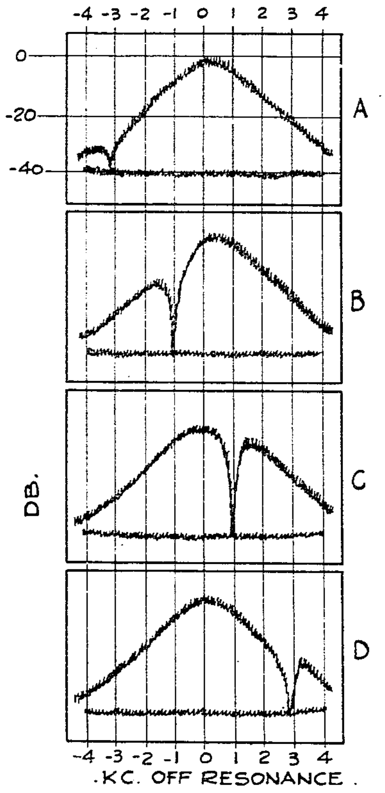

Figure 5 illustrates characteristic transmission versus frequency oscillographs obtained by the arrangement of Figure 4, with the switches 49 and 63 set for null response. They were made by using a typical communications receiver, and connecting the shielded conductor 42 of Figure 4 to the plate of the intermediate frequency amplifier section. The transmission scale on the vertical axis is logarithmic. The horizontal extent of the pattern represents the frequency band transmitted by the intermediate frequency amplifier. The notch which appears in each of the Figures 5A, B, C, and D, represents the null obtained by use of the present invention. It is shifted from one position to another, relative to the curve representing the frequency transmitting characteristics of the intermediate frequency amplifier, by tuning the resonant circuit 59. Note that the lower end of the notch remains upon the base reference line, and that for the full tuning range the depth of the null remains better than 40 decibels down from the normal response.

Figure 6 shows a transmission versus frequency oscillograph for the same equipment but adjusted for peak response. The oscillograph compares favorably with that obtained from communications receivers equipped with conventional crystal filters for C. W. reception.

Figure 7 illustrates a typical transmission versus frequency oscillograph showing how the peak can be superposed upon the transmission characteristics of an intermediate frequency amplifier. With the peak located coincident with the carrier frequency, the result is exalted-carrier reception. This characteristic is useful with relatively stable communications receivers having band spread tuning, and signal strength meters, because the tuning may be carried out by maximizing the meter indication in the usual way. It is also possible for the response peak to be tuned to one side of the receiver passband for reception of reduced-carrier single-side band signals. Symmetry of the peak with respect to the normal passband in Figure 4 is affected by the tuning of the condenser 71 which forms a resonant circuit with inductance 68. The same effect is obtained by tuning of resonant circuit 16 in Figure 1. Symmetry may be restored by a slight change in these circuits when the peak is slightly off center.

In some applications it is desirable to use two units of equipment, each in accordance with Figure 4. By connecting these units to successive stages on an amplifier chain, it is possible to secure greater flexibility for the overall system. When applied to a standard communications receiver, one of the units can be tuned to the same frequency as the receiver's crystal filter to give the effect of two crystals in series. The second unit can be stagger tuned with respect to the resonant frequency of the crystal, thereby providing a broader selective passband. It is also possible to operate the second unit as a null device, to eliminate any especially troublesome interference. Assuming the use of two such units with a communications receiver for phone reception, the two units can be arranged to provide nulls on each side of the normal receiver passband. A conventional crystal filter in the receiver can then be utilized to determine the characteristics of the center of the passband. The nulls serve to steepen the sides of the passband thus determined and can be imposed on any specific interfering signal which may affect the receiver.

I claim:

1. A frequency selective apparatus for application to electrical networks of the type having a conductor lead to which radio frequency voltages are applied, comprising a vacuum tube having plate, cathode and control grid elements, a conducting path connected between said conductor and a point of neutral potential and including the plate to cathode path of the tube and a feedback loop including a tuned regenerative amplifier connected to the plate and control grid of said tube, said loop at the resonant frequency of said amplifier providing negative feedback to the tube whereby said path has negligible impedance at the selected frequency to which the amplifier is tuned and relatively high impedance for frequencies above and below the selected frequency, said tuned regenerative amplifier including an amplifier tube having plate, cathode and control grid elements, a tuned circuit comprising an inductance and first and second serially connected capacitances shunted across said inductance, the resonant frequency of the tuned circuit being independent of the frequency characteristics of the network, one terminal of the inductance which is connected to said first capacitance being connected to the plate of said last mentioned tube and the other terminal of said inductance being connected to the control grid of said first mentioned tube and coupled to the control grid of the second mentioned tube, the point of connection between the first and second capacitances being connected to a point of neutral potential and to the cathode of the second mentioned tube, the first capacitance being adjustable and having a value substantially one-half the value of the second capacitance.

2. A frequency selective apparatus for application to electrical networks having a conductor lead to which radio frequency voltages are applied comprising a first vacuum tube having plate, cathode and control grid elements, a conductive path connected between said conductor and a point of neutral potential including the plate to cathode path of the tube, and a feedback loop including a tuned regenerative amplifier connected to the plate and control grid of said tube, said tuned regenerative amplifier including a vacuum tube having plate, cathode and control grid elements, and a tuned circuit regeneratively connected thereto, said tuned regenerative amplifier providing negative feedback to the first tube whereby said path has negligible impedance at the frequency to which the regenerative amplifier is tuned and relatively high impedance for frequencies above and below the selected frequency.

3. A frequency selective apparatus for application to electrical networks having a conductor lead to which radio frequency voltages are applied comprising a first vacuum tube having plate, cathode and control grid elements, a tuned regenerative amplifier including a tube having plate, cathode and control grid elements and a tuned circuit regeneratively connected thereto, means for connecting said tuned regenerative amplifier to said first tube to provide negative feedback to the same, a conductive path connected between said conductor and a point of neutral potential, selective means for selectively connecting said first tube or said regenerative amplifier in said conductive path, whereby when said regenerative amplifier is connected in said path positive feedback is applied to said conductor to give an exalted radio frequency voltage and when said first tube is connected in said path there is a negligible impedance at the selected frequency to which the amplifier is tuned and a relatively high impedance for frequencies above and below the selected frequency.

References Cited in the file of this patent

UNITED STATES PATENTS

| | | |
|---|---|---|
| 2,227,590 | Landon | Jan. 7, 1941 |
| 2,235,565 | Roberts | Mar. 18, 1941 |
| 2,278,801 | Rust et al. | Apr. 7, 1942 |
| 2,579,345 | Sziklai | Dec. 18, 1951 |
| 2,600,870 | Hathaway et al. | June 17, 1952 |
| 2,606,973 | Scott | Aug. 12, 1952 |

OTHER REFERENCES

"Simplified Q Multiplier," by Harris, from "Electronics," May 1951, p. 130.

"Flexible Selectivity for Communications Receivers," by Villard, Jr., and Rorden, from "Electronics," April 1952, vol. 25, No. 4, pp. 138–140.